United States Patent
Kumar et al.

(10) Patent No.: US 11,066,941 B2
(45) Date of Patent: Jul. 20, 2021

(54) TRANSITION DUCT SUPPORT AND METHOD TO PROVIDE A TUNED LEVEL OF SUPPORT STIFFNESS

(71) Applicant: SIEMENS AKTIENGESELLSCHAFT, Munich (DE)

(72) Inventors: Manish Kumar, Charlotte, NC (US); Joseph L. Evins, Fort Mill, SC (US); Khamhou Sayavong, Charlotte, NC (US); Matthias Hase, Mülheim (DE); Miguel Bascones, Oviedo, FL (US); Adam J. Weaver, Fort Mill, SC (US); Robert H. Bartley, Oviedo, FL (US); Lashanda N. Williams, Charlotte, NC (US)

(73) Assignee: Siemens Energy Global GmbH & Co. KG, Munich (DE)

( * ) Notice: Subject to any disclaimer, the term of this patent is extended or adjusted under 35 U.S.C. 154(b) by 516 days.

(21) Appl. No.: 15/531,762

(22) PCT Filed: Dec. 11, 2014

(86) PCT No.: PCT/US2014/069666
§ 371 (c)(1),
(2) Date: May 31, 2017

(87) PCT Pub. No.: WO2016/093829
PCT Pub. Date: Jun. 16, 2016

(65) Prior Publication Data
US 2017/0268355 A1    Sep. 21, 2017

(51) Int. Cl.
*F23R 3/60* (2006.01)
*F01D 9/02* (2006.01)
(Continued)

(52) U.S. Cl.
CPC ............. *F01D 9/023* (2013.01); *F01D 25/04* (2013.01); *F23R 3/60* (2013.01); *F02C 3/00* (2013.01); *F05D 2260/96* (2013.01)

(58) Field of Classification Search
CPC .. F01D 9/023; F01D 25/04; F23R 3/60; F23R 3/002; F23R 3/425; F23R 2900/00005;
(Continued)

(56) References Cited

U.S. PATENT DOCUMENTS

| 3,759,038 A | 9/1973 | Scalzo et al. |
| 4,422,288 A | 12/1983 | Steber |

(Continued)

FOREIGN PATENT DOCUMENTS

| EP | 2530246 A2 | 5/2012 |
| JP | H01155120 A | 6/1989 |

(Continued)

*Primary Examiner* — Todd E Manahan
*Assistant Examiner* — Thuyhang N Nguyen

(57) ABSTRACT

A transition duct support apparatus and a method to support an exit frame in a transition duct in a gas turbine engine are provided. A stiffener (24) may be arranged to provide support to an outer edge (27) of an exit frame (12) in a transition duct (14). Stiffener (24) may be configured to circumferentially extend between mutually opposed corners (30) of the exit frame of the transition duct. A brace (26) may be connected to a centrally-disposed section (20) and may extend to support respective end portions (32) of the stiffener. The support apparatus is effective to provide a respective tuned level of stiffness support with respect to one or more axes of the exit frame in the transition duct. The apparatus and method may be effective for distributing mechanical stresses on the exit frame of the transition duct and/or neighboring regions in the transition duct.

9 Claims, 9 Drawing Sheets

(51) Int. Cl.
*F01D 25/04* (2006.01)
*F02C 3/00* (2006.01)

(58) Field of Classification Search
CPC .............. F23R 2900/00017; F02C 7/20; F05D 2260/96; F05D 2240/35; F05D 2300/603
See application file for complete search history.

(56) References Cited

U.S. PATENT DOCUMENTS

| | | | |
|---|---|---|---|
| 5,761,898 A | 6/1998 | Barnes et al. | |
| 6,442,946 B1 * | 9/2002 | Kraft | F01D 9/023 60/796 |
| 6,662,567 B1 | 12/2003 | Jorgensen | |
| 7,278,254 B2 * | 10/2007 | Youngblood | F01D 9/023 60/39.37 |
| 7,527,469 B2 | 5/2009 | Zborovsky et al. | |
| 7,584,620 B2 | 9/2009 | Weaver et al. | |
| 7,918,433 B2 * | 4/2011 | Melton | F01D 9/023 248/674 |
| 8,322,146 B2 | 12/2012 | Rizkalla et al. | |
| 2006/0162314 A1 * | 7/2006 | Youngblood | F01D 9/023 60/39.37 |
| 2006/0288707 A1 | 12/2006 | Weaver et al. | |
| 2009/0010755 A1 * | 1/2009 | Keller | F01D 21/045 415/197 |
| 2009/0188258 A1 | 7/2009 | Rizkalla et al. | |
| 2012/0200046 A1 | 8/2012 | Green et al. | |
| 2014/0165359 A1 | 6/2014 | Holmes et al. | |
| 2014/0260280 A1 * | 9/2014 | Willis | F01D 9/023 60/752 |

FOREIGN PATENT DOCUMENTS

| | | |
|---|---|---|
| JP | H10288048 A | 10/1998 |
| JP | 2001173955 A | 6/2001 |
| JP | 2003322337 A | 11/2003 |
| JP | 2008502846 A | 1/2008 |
| JP | 2008185255 A | 8/2008 |

* cited by examiner

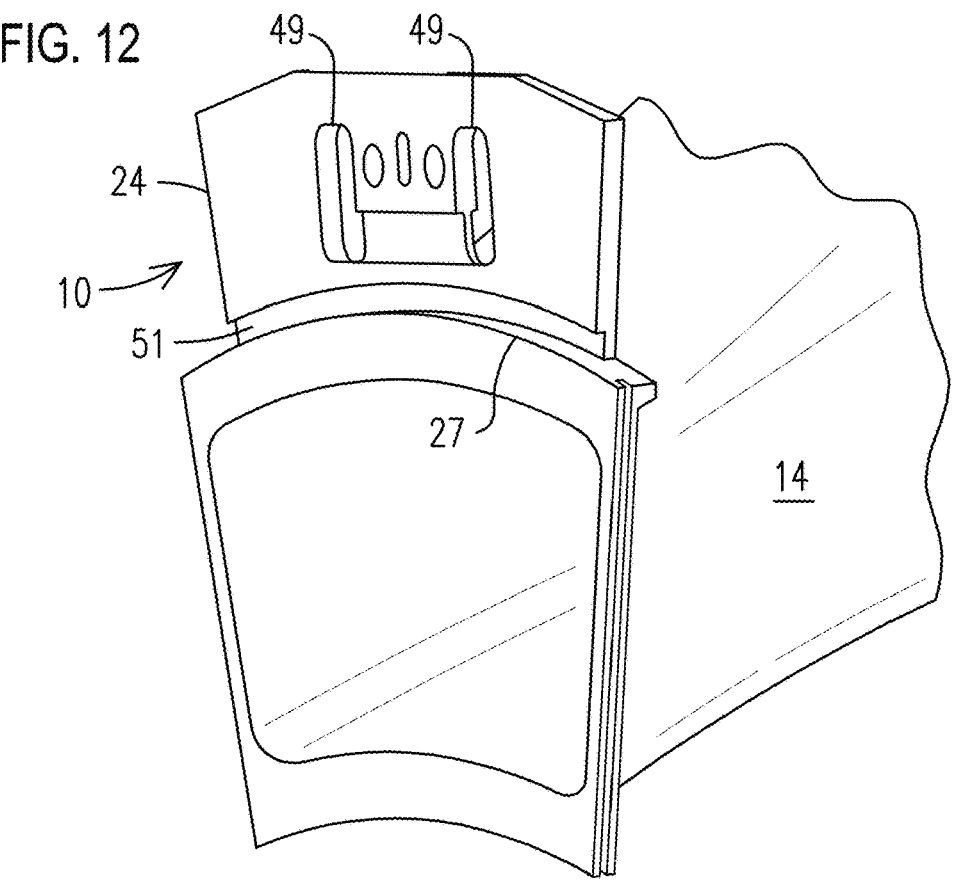
FIG. 12
FIG. 13
FIG. 14
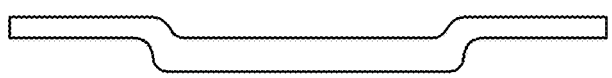
FIG. 15
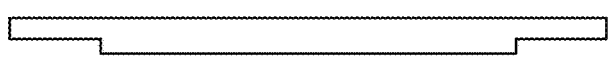
FIG. 16
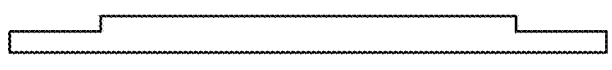
FIG. 17
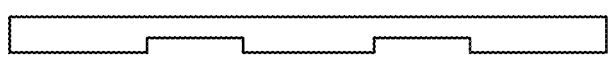
FIG. 18
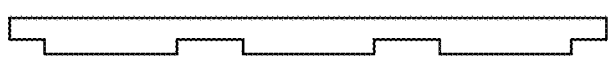

US 11,066,941 B2

TRANSITION DUCT SUPPORT AND METHOD TO PROVIDE A TUNED LEVEL OF SUPPORT STIFFNESS

BACKGROUND

1. Field

Disclosed embodiments relate in general to turbine engines, such as gas turbine engines. More particularly, disclosed embodiments relate to transition ducts in the combustor section of a turbine engine, and, even more particularly, to an apparatus and a method for supporting the exit frame of a transition duct in a turbine engine.

2. Description of the Related Art

State of the art, high-efficiency turbine engines, such as gas turbine engines, require ever increasing firing temperatures to reduce costs of operation, as may involve extracting the greatest amount of useful power from the fuel consumed while reducing combustion emissions, such as NOx emissions. In such turbines, the supporting and sealing structure of a combustion system should be capable of accommodating such higher firing temperatures without over-stressing associated components. Reference is made to U.S. Pat. No. 7,584,620 in connection with one known system for supporting the exit frame of transition ducts.

BRIEF DESCRIPTION OF THE DRAWINGS

FIG. 12 is a perspective view of an eighth non-limiting embodiment of a transition duct support apparatus embodying aspects of the present invention.

FIGS. 13 through 18 are respective top views illustrating respective non-limiting example configurations of varying cross-sectional profiles configured to attain the respective tuned level of stiffness support.

FIG. 19 is an exploded view of such sections and FIG. 20 is an assembled view of such sections.

DETAILED DESCRIPTION

Figure 2:
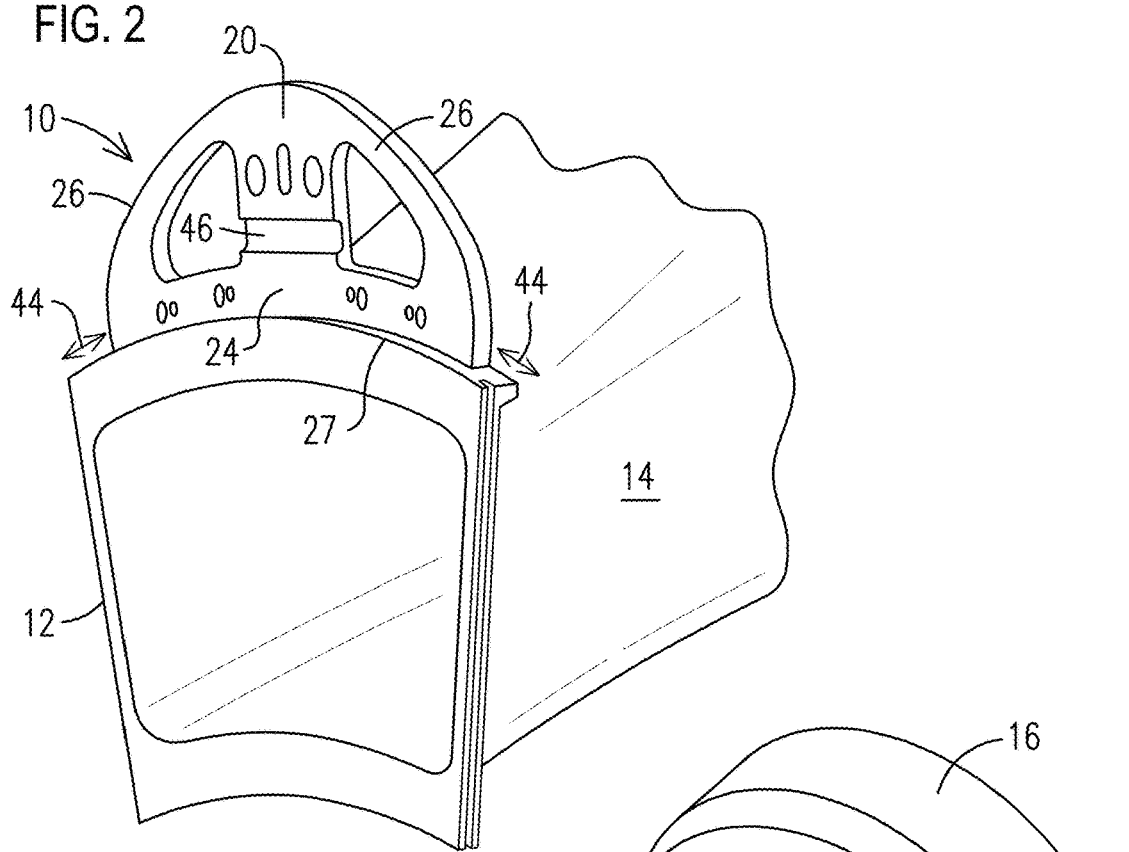
FIG. 2 is a perspective view of a second non-limiting embodiment of a transition duct support apparatus embodying aspects of the present invention.

The inventors of the present invention have recognized some issues that can arise in the context of certain prior art combustion systems in turbine engines, such as gas turbine engines. For example, under the relatively high thermal gradients and mechanical loads that typically arise in a combustion process, concomitant high stresses have been observed, for example, in the corners of the respective exit frames of the transition ducts and in regions of the transition ducts neighboring such corners. Consequently, the life of the transition ducts in such prior art combustor systems can be adversely affected.

At least in view of such recognition, the present inventors propose an innovative apparatus and method for supporting the respective exit frames of the transition ducts in the turbine engine. The proposed apparatus and method may be effective to reinforce an outer edge of the exit frame, and is thus effective to reduce deflections in such a frame, and may be further effective to reducing the relatively high stresses otherwise observed at the corners of the respective exit frames of the transition ducts by appropriately re-distributing (e.g., spreading) such stresses, not just over the exit frame but over regions of the transition duct as well.

In addition to reducing stresses on the transition ducts, associated components, such as transition seals, can also benefit from the proposed apparatus. For example, since the proposed apparatus reduces deflections on the exit frame, the proposed apparatus is conducive to reducing mechanical loads (e.g., due to contact) on the transition seals. Furthermore, the reduced stresses and deflections may in turn be conducive to improved utilization of combustion air, such as due to improved leakage reduction, and this improved utilization of combustion air in turn may be conducive to reduction of NOx emissions.

The proposed apparatus is configured to provide stiffness to the exit frame that can be appropriately tuned to, for example, meet the expected mounting stiffness needs of a given combustor system. For example, the mounting support provided by the proposed apparatus should be sufficiently stiff to, for example, damp excessive levels of vibrations that could cause loosening from an affixing connection to a stationary structure of a turbine section of the engine, such as a turbine vane carrier (TVC). Conversely, the mounting support provided by the proposed apparatus should be sufficiently flexible to, for example, accommodate thermal growth, and thus avoid crack formation due to thermal growth. The proposed apparatus is expected to offer substantial versatility for reliably and cost-effectively tuning (e.g., tailoring) the stiffness to appropriately meet the mounting needs at the exit frames of any given transition duct in a turbine engine.

In the following detailed description, various specific details are set forth in order to provide a thorough understanding of such embodiments. However, those skilled in the art will understand that embodiments of the present invention may be practiced without these specific details, that the present invention is not limited to the depicted embodiments, and that the present invention may be practiced in a variety of alternative embodiments. In other instances, methods, procedures, and components, which would be well-understood by one skilled in the art have not been described in detail to avoid unnecessary and burdensome explanation.

Furthermore, various operations may be described as multiple discrete steps performed in a manner that is helpful for understanding embodiments of the present invention. However, the order of description should not be construed as to imply that these operations need be performed in the order they are presented, nor that they are even order dependent, unless otherwise indicated. Moreover, repeated usage of the phrase "in one embodiment" does not necessarily refer to the same embodiment, although it may. It is noted that disclosed embodiments need not be construed as mutually exclusive embodiments, since aspects of such disclosed embodiments may be appropriately combined by one skilled in the art depending on the needs of a given application.

The terms "comprising", "including", "having", and the like, as used in the present application, are intended to be synonymous unless otherwise indicated. Lastly, as used herein, the phrases "configured to" or "arranged to" embrace the concept that the feature preceding the phrases "configured to" or "arranged to" is intentionally and specifically designed or made to act or function in a specific way and should not be construed to mean that the feature just has a capability or suitability to act or function in the specified way, unless so indicated.

Figure 1:
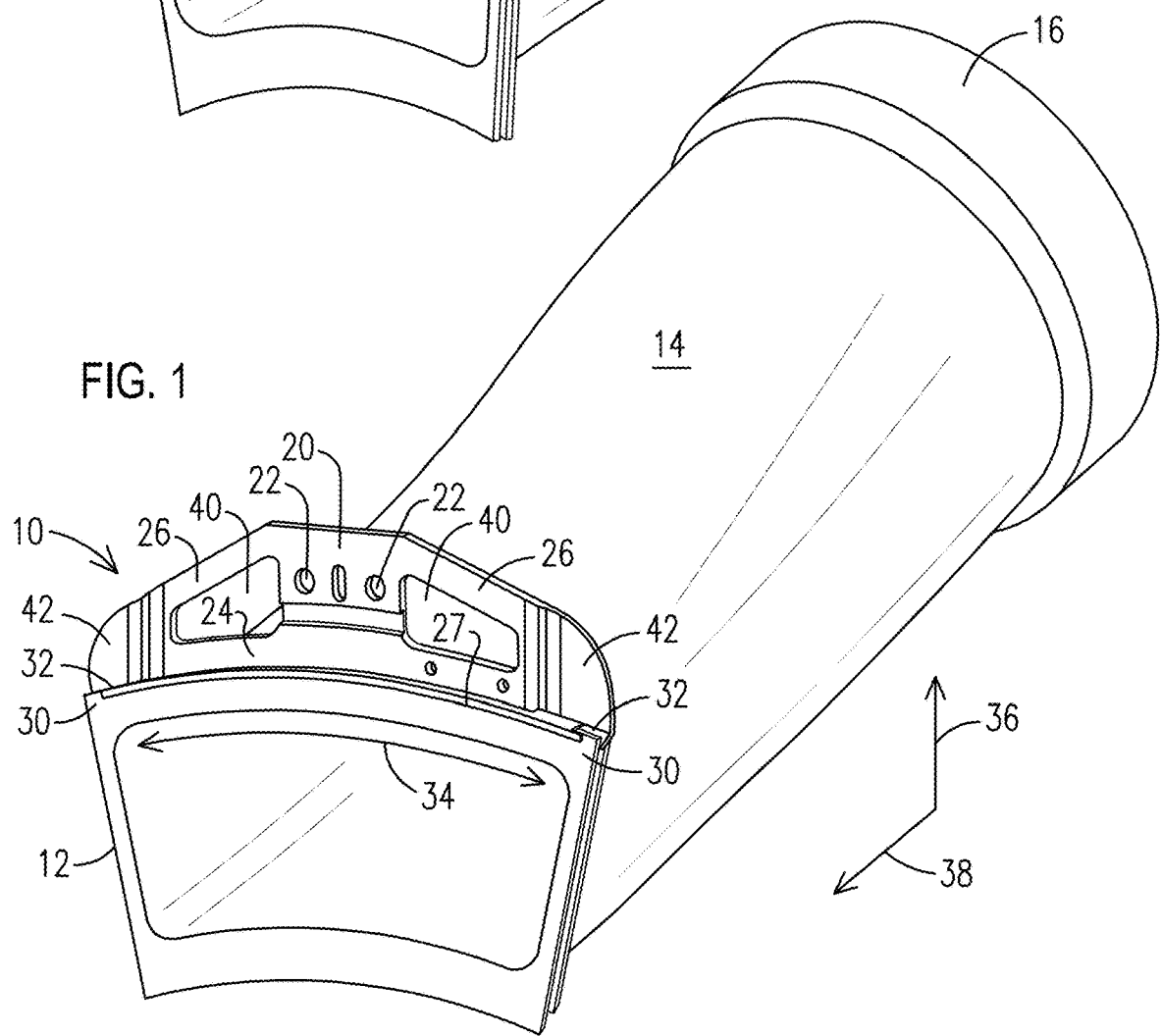
FIG. 1 is a perspective view of a first non-limiting embodiment of a transition duct support apparatus that in accordance with aspects of the present invention may be configured to provide a tuned level of stiffness support to the exit frame of the transition duct.

FIG. 1 is a perspective view of a first non-limiting embodiment of a transition duct support apparatus 10 that in accordance with aspects of the present invention may be configured to provide a tuned level of stiffness support to the exit frame 12 of a transition duct 14. In one non-limiting embodiment, transition duct 14 at its upstream end, includes an inlet ring 16 for interfacing with a combustion basket (not shown), and at its downstream end, transition duct 14 includes exit frame 12 for interfacing with a turbine section (not shown).

In one non-limiting embodiment, transition duct support apparatus 10 includes a centrally-disposed section 20 including one or more connecting openings 22 for receiving affixing means (e.g., through bolts, etc.) to connect to a stationary structure (not shown) of the turbine section of the engine, such as a turbine vane carrier (TVC). Transition duct support apparatus 10 further includes a stiffener 24 disposed radially inwardly relative to centrally-disposed section 20. Stiffener 24 is connected to centrally-disposed section 20 and is arranged to provide support to an outer edge 27 of exit frame 12 in transition duct 14. Stiffener 24 is configured to circumferentially extend between mutually opposed corners 30 of exit frame 12 in transition duct 14.

A brace 26 may be connected to centrally-disposed section 20 and may extend towards mutually opposed corners 30 to support respective end portions 32 of stiffener 24. Support apparatus 10 is effective to provide a respective tuned level of stiffness support with respect to one or more axes of exit frame 12 in transition duct 14. As shown in FIG. 1, a non-limiting example frame of reference may comprise a circumferential axis 34, a radial axis 36 and a longitudinal axis 38. In one non-limiting embodiment, support apparatus 10 may include at least one access opening 40 for allowing access to perform assembly operations, such as may involve affixing/positioning of elements associated with the transition, such as transition seals, etc.

In one non-limiting embodiment, transition duct support apparatus 10 may comprise a varying cross-sectional profile (e.g., a three-dimensionally varying cross-sectional profile) configured to attain the respective tuned level of stiffness support with respect to the one or more axes of the exit frame in the transition duct. For example, in one non-limiting embodiment, respective wingtips 42 of brace 26 may comprise relatively thinner structures relative to other structures in support apparatus 10.

FIGS. 13 through 18 are respective top views (e.g., along radial axis 36 FIG. 1) illustrating respective non-limiting example configurations of varying cross-sectional profiles that may be configured on support apparatus 10 to attain the respective tuned level of stiffness support. The varying cross-sectional profile may be further configured to meet other non-limiting practical considerations, such as to enable transition seal fixation, provide interface structure for seal support, or provide a sealing surface.

In one non-limiting embodiment, as may be appreciated in FIG. 1, stiffener 24 may be configured to extend to the mutually opposed corners 30 of exit frame 12 of transition duct 14. However, as may be appreciated in FIG. 2, stiffener 24 need not circumferentially extend up to the mutually opposed corners 30 of exit frame 12 of transition duct 14, as schematically represented by way of twin-headed arrows 44. It will be appreciated that the cross-sectional profile of the support apparatus need not involve a varying cross-sectional profile, as discussed above in the context of FIG. 1.

Figure 3:
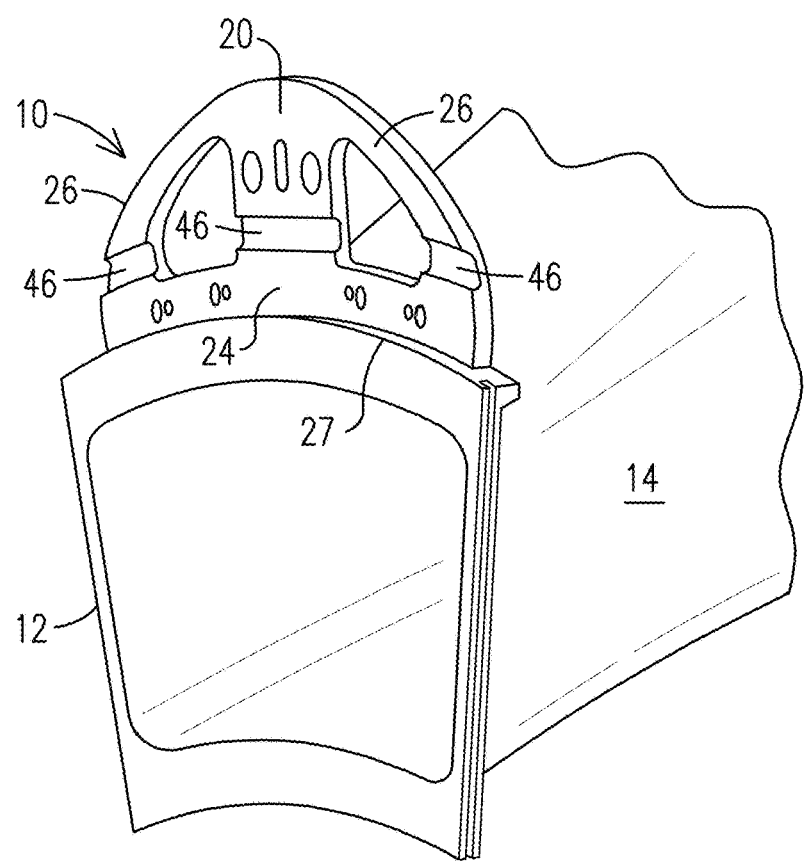
FIG. 3 is a perspective view of a third non-limiting embodiment of a transition duct support apparatus embodying aspects of the present invention.

As will be appreciated by one skilled in the art, stiffening support that, for example, may be provided relative to the radial and longitudinal axes 36, 38 may in turn provide a stiffening effect with respect to bending about circumferential axis 34. In some non-limiting applications, one may desire to tune (e.g., adjust) the level of such stiffening effect. In one non-limiting embodiment, as may be appreciated in FIG. 2, a circumferentially extending notch 46 may be disposed in central section 10. In an alternative embodiment, one may arrange further circumferentially-extending notches 46 in brace 26 as illustrated in FIG. 3.

Figure 24:
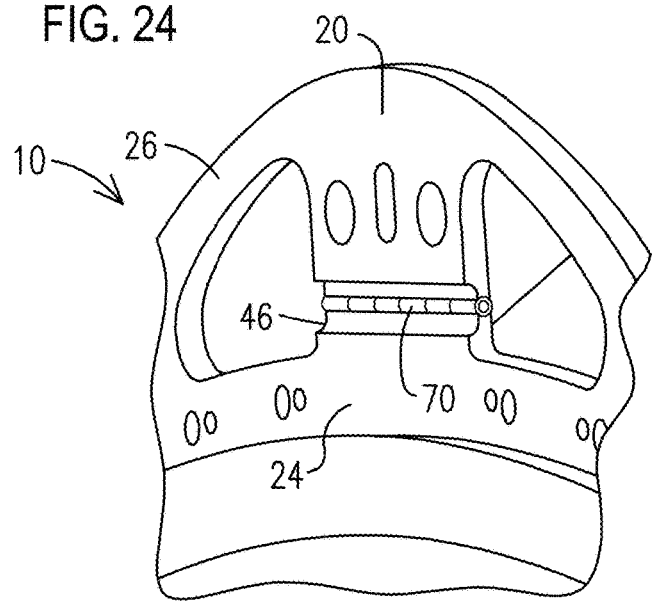
FIG. 24 is a non-limiting embodiment of a transition duct support apparatus embodying aspects of the present invention, where one can optionally employ one or more hinges to provide a desired amount of bending flexibility (e.g., stiffness reduction) about a respective axis of the exit frame.

As illustrated in FIG. 24, in lieu of or in combination with such notches, one could optionally arrange one or more hinges 70 to provide a desired amount of bending flexibility (e.g., stiffness reduction) about a respective axis. It will be appreciated that the degree of stiffness, orientation and location of such notches and/or hinges may be selected based on a target level of stiffness for the exit frame. For example, based on the needs of a given application, further notches and/or hinges could be arranged to extend along radial axis 36 which would provide bending flexibility about such axis, if so desired.

Figure 4:
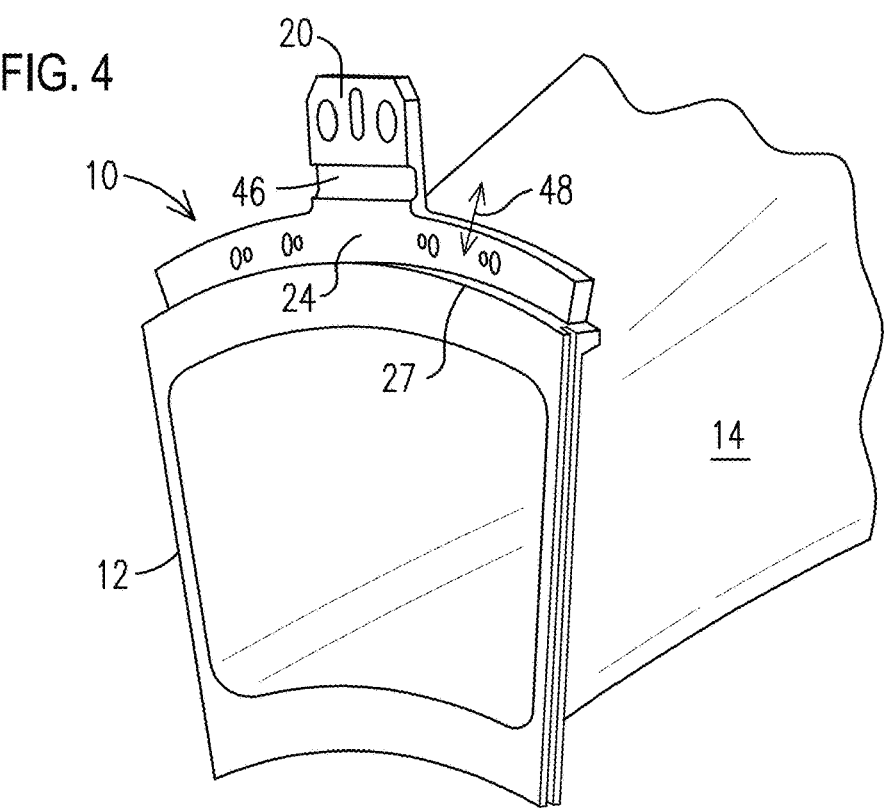
FIG. 4 is a perspective view of a fourth non-limiting embodiment of a transition duct support apparatus embodying aspects of the present invention.
Figure 6:
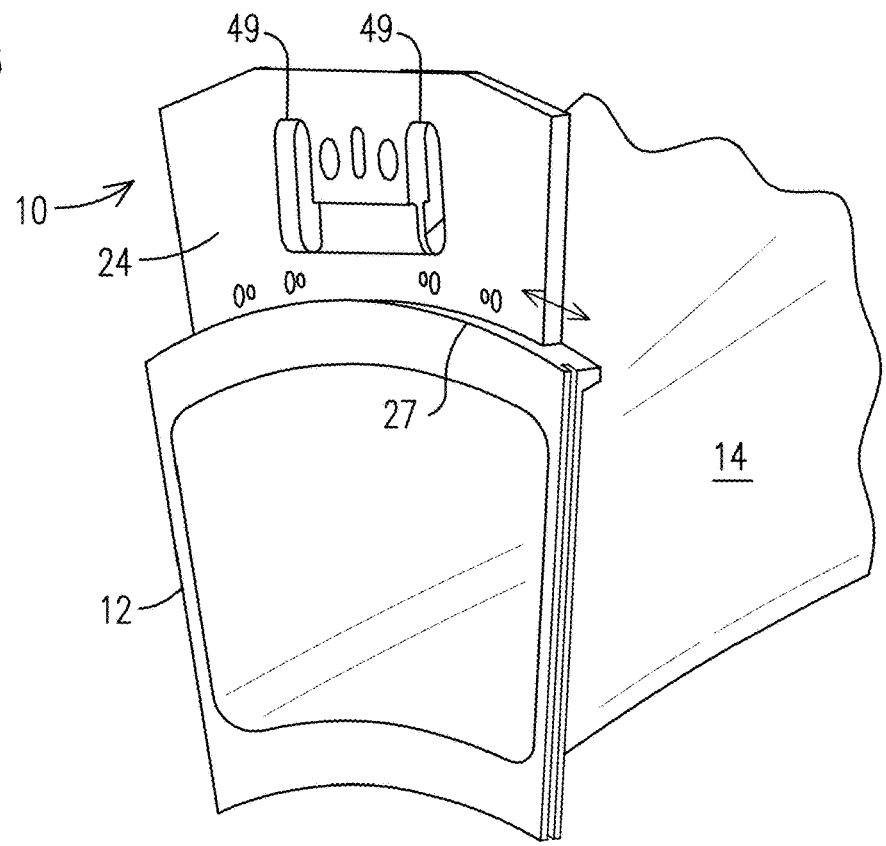
FIG. 6 is a perspective view of a sixth non-limiting embodiment of a transition duct support apparatus embodying aspects of the present invention.
Figure 7:
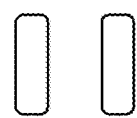
FIGS. 7 through 10 illustrate respective non-limiting example configurations of through holes that may be configured to attain the respective tuned level of stiffness support.
Figure 8:
Figure 9:
Figure 10:
Figure 11:
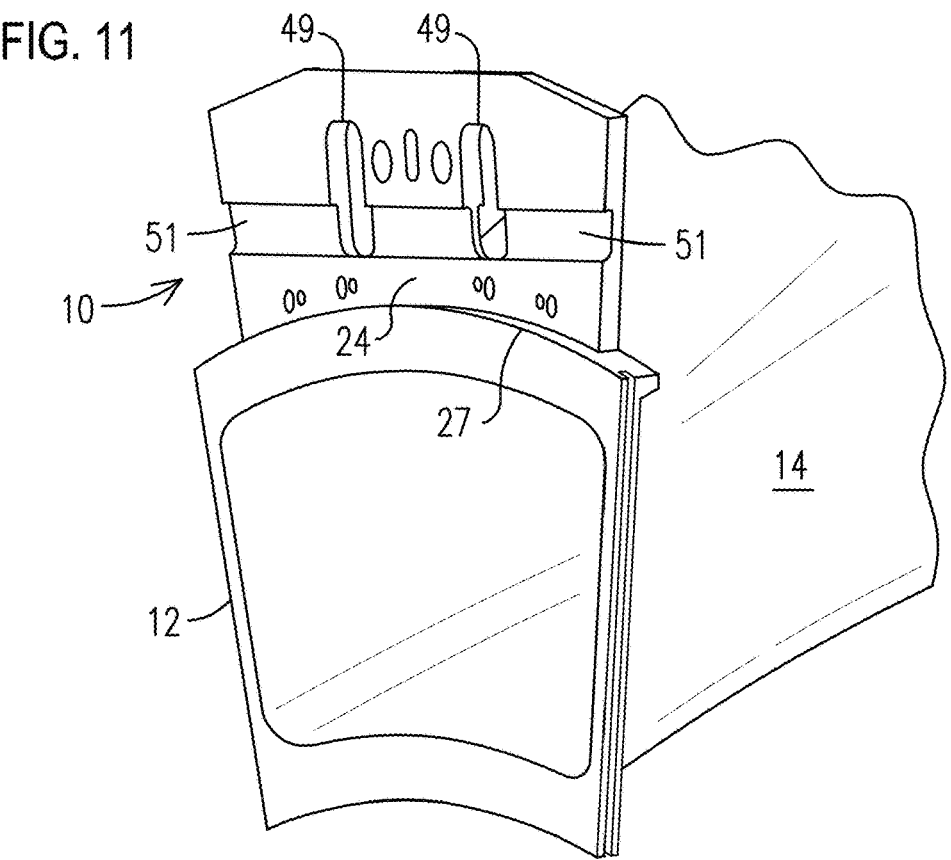
FIG. 11 is a perspective view of a seventh non-limiting embodiment of a transition duct support apparatus embodying aspects of the present invention.

In one non-limiting embodiment, as illustrated in FIG. 4, stiffener 24 may be configured to outwardly extend to a predefined radial distance (schematically represented by twin-headed arrow 48) based on the respective tuned level of stiffness support to be provided with respect to the one or more axes of the exit frame in the transition duct. It will be appreciated that, subject to stiffness and other practical constraints, one could extend the height of stiffener 24 to practically form an integral plate, as illustrated in the non-limiting embodiments respectively illustrated in FIGS. 6, 11 and 12. It will be appreciated that aspects of the present invention are not limited to any particular type of structural and/or manufacturing modality. For example, a transition duct support apparatus embodying aspects of the present invention may be formed as a layered or as a non-layered composite structure depending on the needs of a given application.

It would be appreciated that the geometry of a support apparatus embodying aspects of the present invention may be tailored based on the needs of a given mounting application. For example, the larger the circumferential support provided to outer edge 27 of exit frame 12 and/or the larger the radial height of stiffener 24, such features would provide relatively stiffer support to exit frame 12, and thus attain a relatively higher level of stress reduction on exit frame 12. However, in practical embodiments, one may need to be mindful of other practical constraints, such as space availability in connection with assembly operations and/or the footprint requirements of the support apparatus itself. As may be respectively appreciated in FIGS. 11 and 12, a support apparatus embodied in a plate configuration, may similarly benefit from appropriately positioned notches 51 and/or hinges. For example, such notches and/or hinges would be effective to tune the level of stiffness about circumferential axis 34.

In one non-limiting embodiment, one or more tuning through holes 49 (FIGS. 6, 11, 12) may be included that may be arranged to attain the respective level of stiffness support with respect to the one or more axes of the exit frame in the transition duct. FIGS. 7 through 10 are respective front views illustrating respective non-limiting example configurations of tuning through-holes that may be configured in support apparatus 10 to attain the respective tuned level of stiffness support. It will be appreciated that any such configurations may be applied in the context of configuring access openings 40 (FIG. 1).

Figure 5:
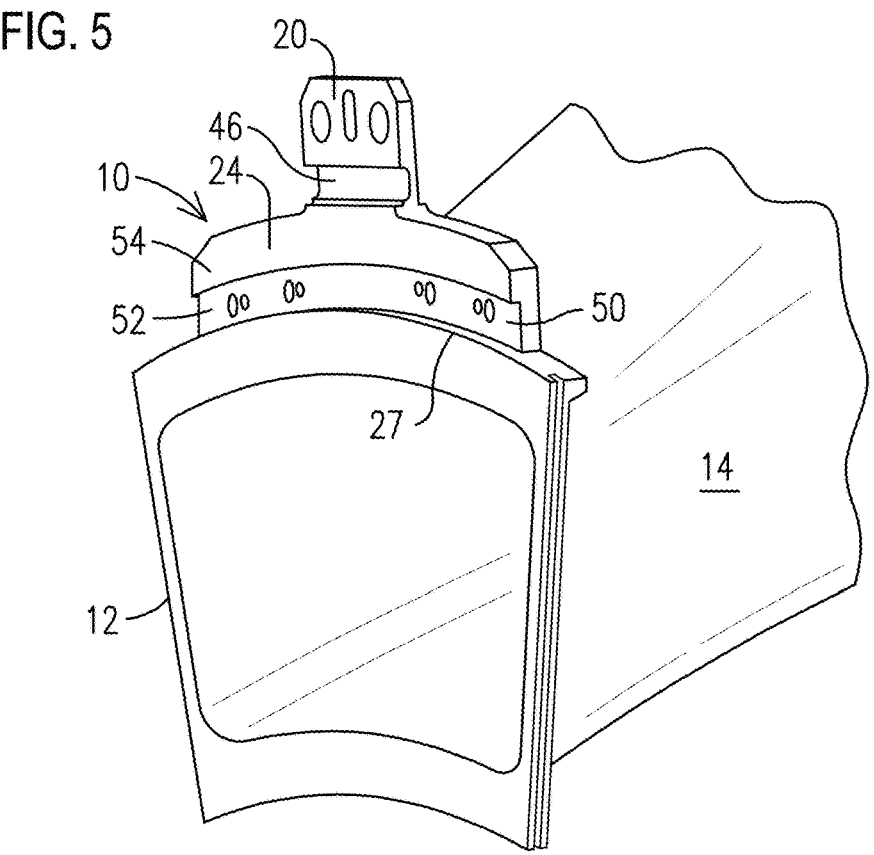
FIG. 5 is a perspective view of a fifth non-limiting embodiment of a transition duct support apparatus embodying aspects of the present invention.

FIG. 5 is a perspective view of one non-limiting embodiment where stiffener 24 comprises a recess 50 that defines a first stiffener stage 52 having a first thickness and a first height, and where recess 50 further defines a second stiffener stage 54, such as disposed radially outwardly relative to first stiffener stage 54. Second stiffener stage 54 may have a second thickness and a second height. The respective thicknesses and heights of the first and second stiffener stages 52, 54 may be configured to attain the respective tuned level of stiffness support with respect to the one or more axes of the exit frame in the transition duct. For example, a relatively thicker second stiffener stage 54 would be effective to increase stiffness support about the longitudinal and the radial axes 36, 38 while a relatively thinner first stiffener stage 52 allows reducing the overall amount of mass of stiffener 24. Optionally, as discussed above, a notch 46 or hinge may be used to decrease stiffness about circumferential axis 34. It will be appreciated by those skilled in the art that the foregoing description provided in the context of first and second stiffener stages should be construed in an example sense and not in a limiting sense since aspects of the present invention are not limited to any specific number of stiffener stages.

Figure 19:
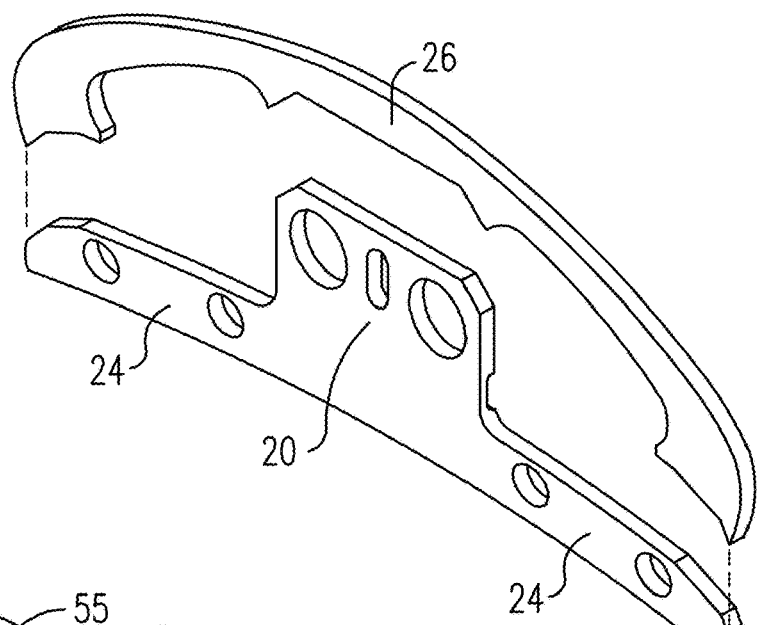
FIGS. 19 and 20 illustrate respective perspective views where a central section and a stiffener of a transition duct support apparatus embodying aspects of the present invention comprise a structure affixable to a brace, where
Figure 20:
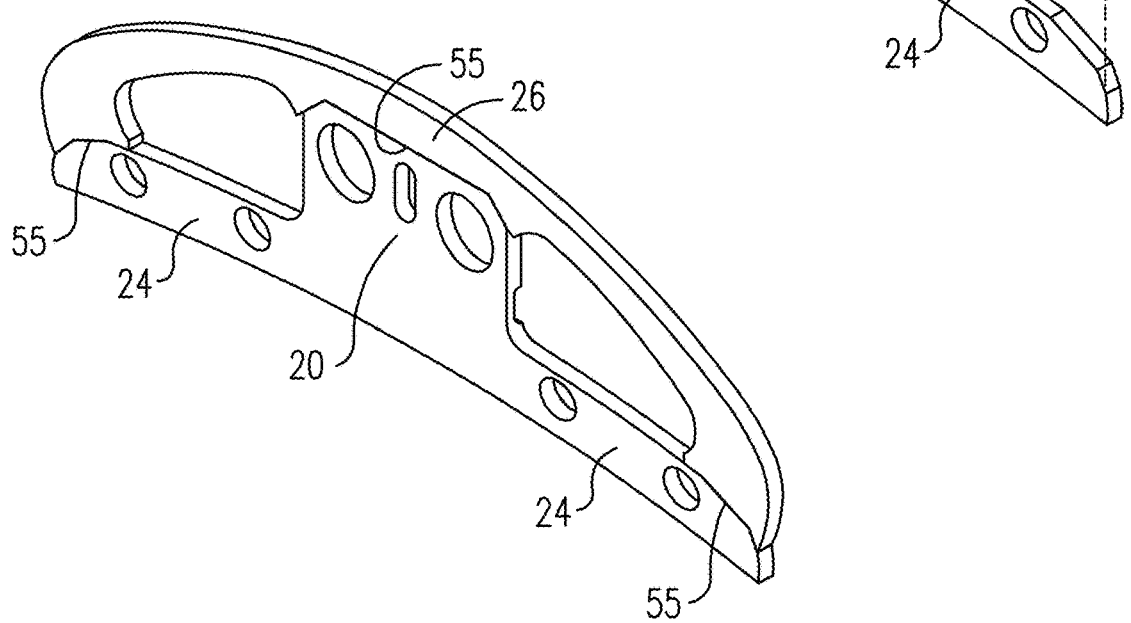

FIGS. 19 and 20 illustrate respective perspective views where a central section 20 and a stiffener 24 of a transition duct support apparatus embodying aspects of the present invention may be formed in an integral structure (e.g., a plate or other suitable structure) affixable by way of appropriate connections 55 (e.g., by way of welding, brazing etc.) to brace 26. FIG. 19 is an exploded view of such sections prior to being affixed to one another and FIG. 20 is an assembled view of such sections. This embodiment may be useful for retrofit applications. It will be appreciated that this embodiment need not be implemented in a plate configuration. For example, the features discussed above in the context of FIG. 1 regarding a varying cross-sectional profile could be applied to this embodiment.

Figure 25:
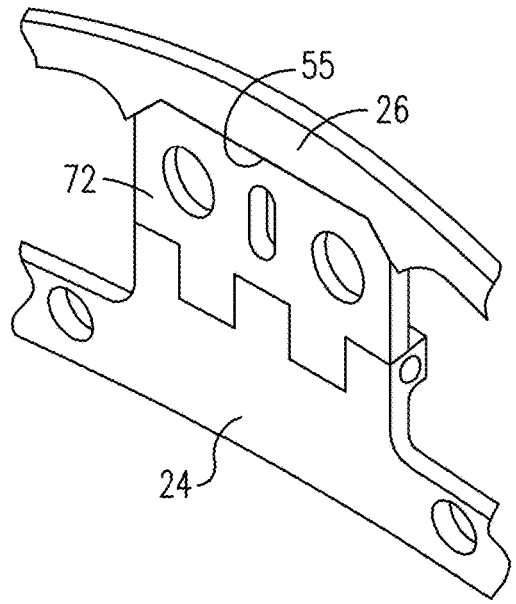
FIG. 25 is illustrative of one non-limiting embodiment of a hinge that could be optionally arranged in the transition duct support apparatus illustrated in FIG. 20.

FIG. 25 is illustrative of one non-limiting embodiment of a hinge 72 that could be optionally arranged in the central section of the support apparatus, if, for example, further bending flexibility about circumferential axis was desirable in a given application. It will be appreciated that the hinge arrangement shown in FIG. 25 should be construed in an example sense and not in a limiting sense being that other hinge arrangements could be effectively employed.

In one non-limiting embodiment, the tuned level of stiffness support may be selected in a range from a level sufficiently high to reduce exit frame displacement in the high vibration environment of the turbine engine to a level that is sufficiently low to accept thermal growth of the exit frame in the high temperature environment of the turbine engine.

In one non-limiting embodiment, the configuring of the stiffener and/or the brace may be effective for distributing mechanical stresses on the exit frame of the transition duct and/or neighboring regions in the transition duct, thereby reducing respective peak levels of stress on the exit frame of the transition duct and/or the neighboring regions in the transition duct. In one non-limiting application, the respective tuned level of stiffness support may be based on expected vibrational modes in the transition duct. For example, the respective tuned level of stiffness support may be configured to avoid dynamic excitation of natural operating frequencies of the transition.

Figure 21:
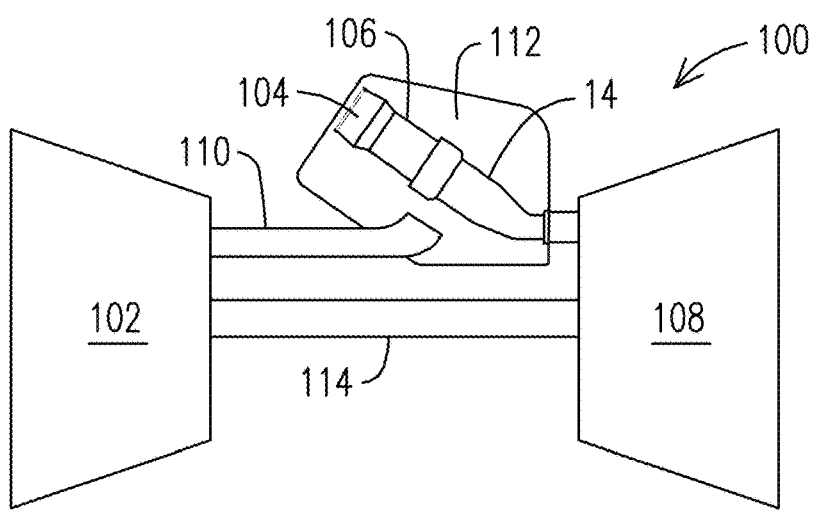
FIG. 21 is a simplified schematic of one non-limiting embodiment of a combustion turbine engine, such as gas turbine engine, that can benefit from disclosed embodiments of the present invention.

FIG. 21 is a simplified schematic of one non-limiting embodiment of a combustion turbine engine 100, such as gas turbine engine, that can benefit from disclosed embodiments of the present invention. Combustion turbine engine 100 may comprise a compressor 102, a combustor 104, a combustion chamber 106, and a turbine 108. During operation, compressor 102 takes in ambient air and provides compressed air to a diffuser 110, which passes the compressed air to a plenum 112 through which the compressed air passes to combustor 104, which mixes the compressed air with fuel, and provides combusted, hot working gas via a transition 14 to turbine 108, which can drive power-generating equipment (not shown) to generate electricity. A shaft 114 is shown connecting turbine 108 to drive compressor 102. Disclosed embodiments of the present invention may be incorporated in each transition (as transition 14) of the gas turbine engine to advantageously achieve reliable and cost-effective mounting stiffness to the exit frame of the transition. The mounting stiffness can be appropriately tuned to, for example, meet the expected mounting stiffness needs of a given combustor system. In operation, this is expected to improve the life of the transition ducts and associated components, such as transition seals, etc.

Figure 22:
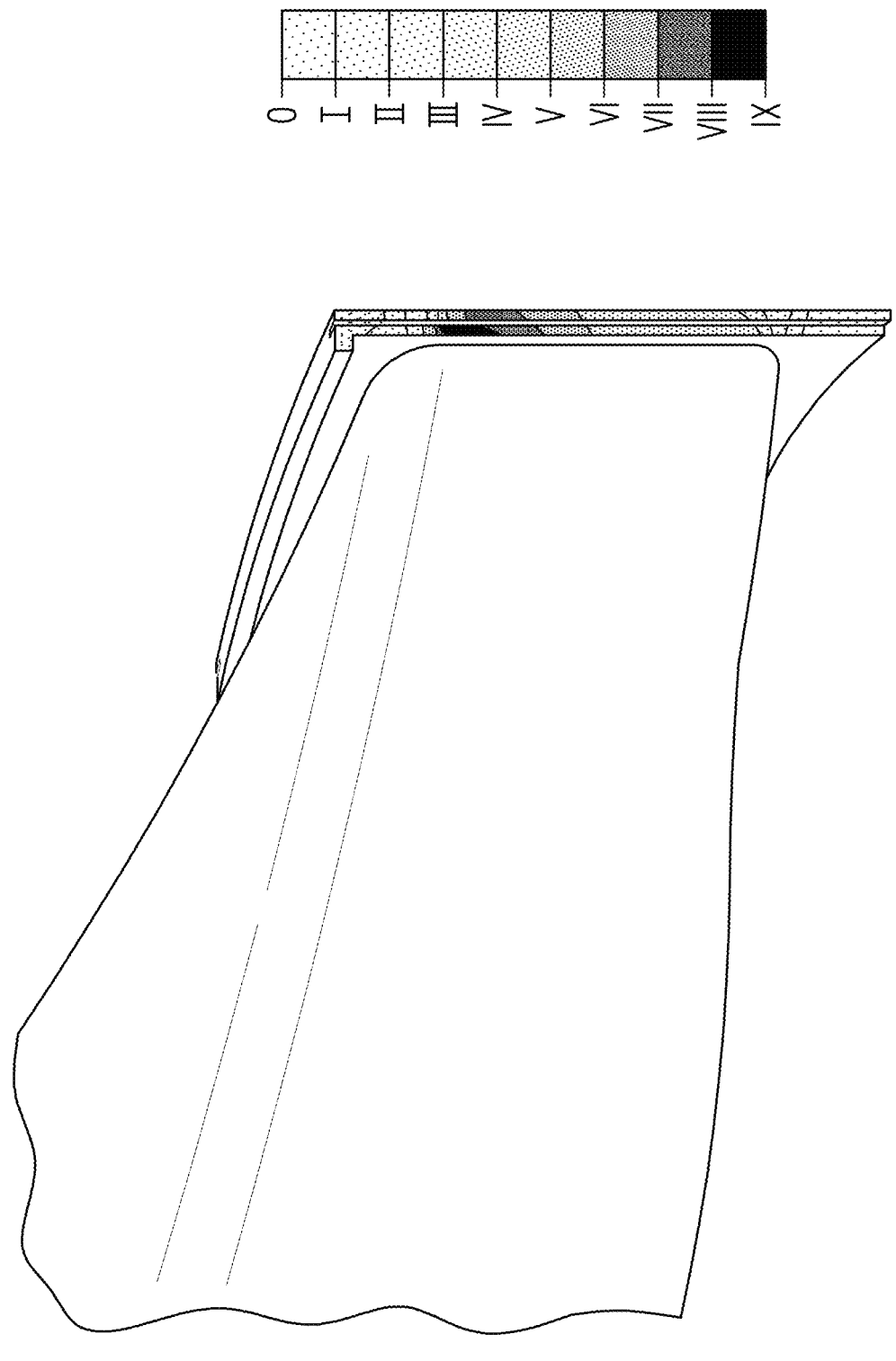
FIGS. 22 and 23 respectively illustrate non-limiting comparative plots of modelled stress distribution on an exit frame of a transition using a prior art support (FIG. 22) compared to modelled stress distribution on an exit frame of a transition comprising a support apparatus embodying aspects of the present invention (FIG. 23).
Figure 23:
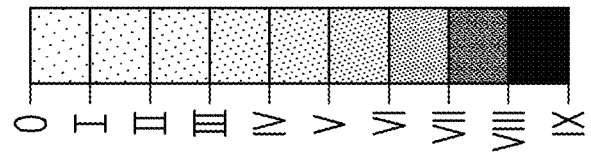
Figure 23:
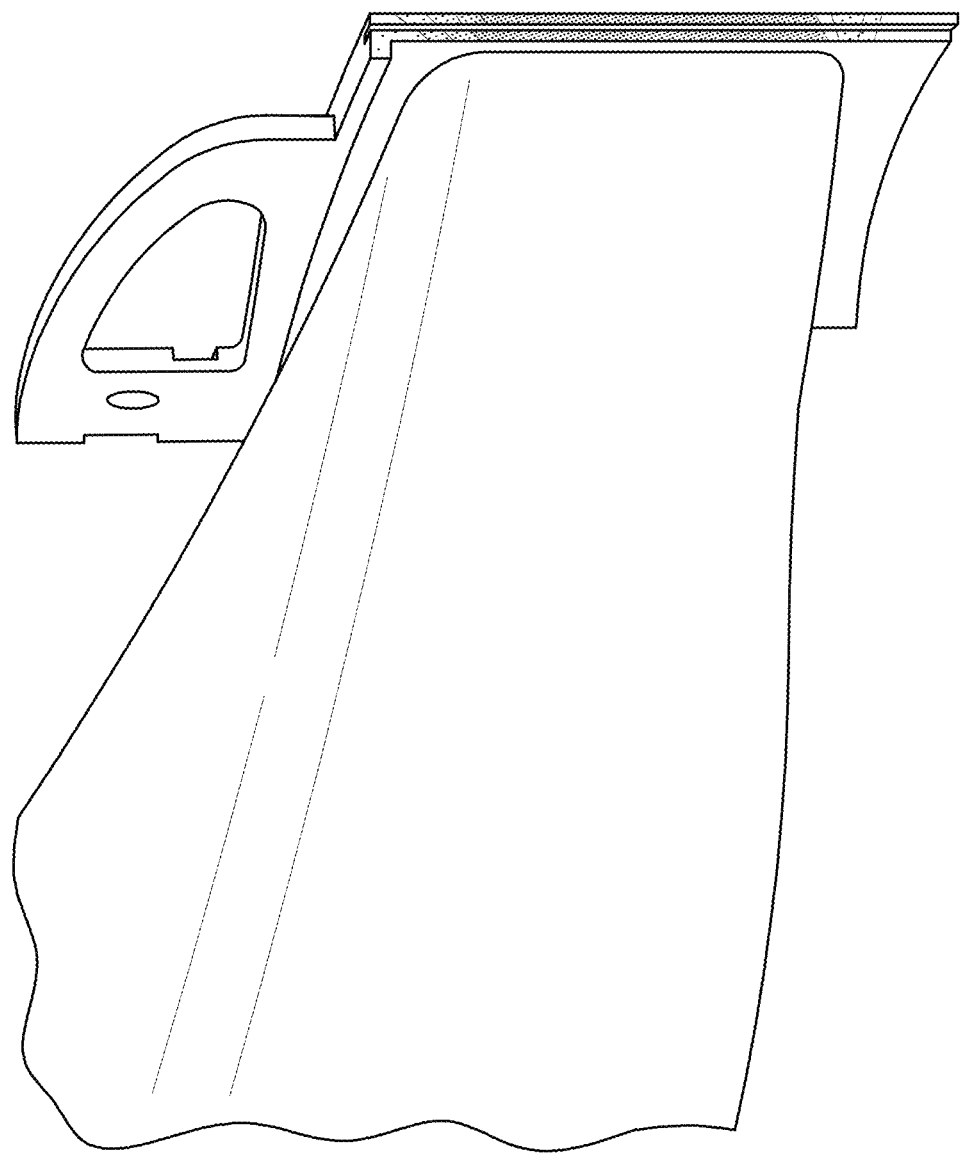

FIGS. 22 and 23 respectively illustrate non-limiting comparative plots of modelled stress distribution on an exit frame using a prior art support (FIG. 21) compared to an exit frame comprising a support apparatus embodying aspects of the present invention. In these non-limiting plots one can observe approximately a 30% reduction in peak stress levels on the exit frame supported with a support apparatus embodying aspects of the present invention compared to the prior art.

Figure 26:
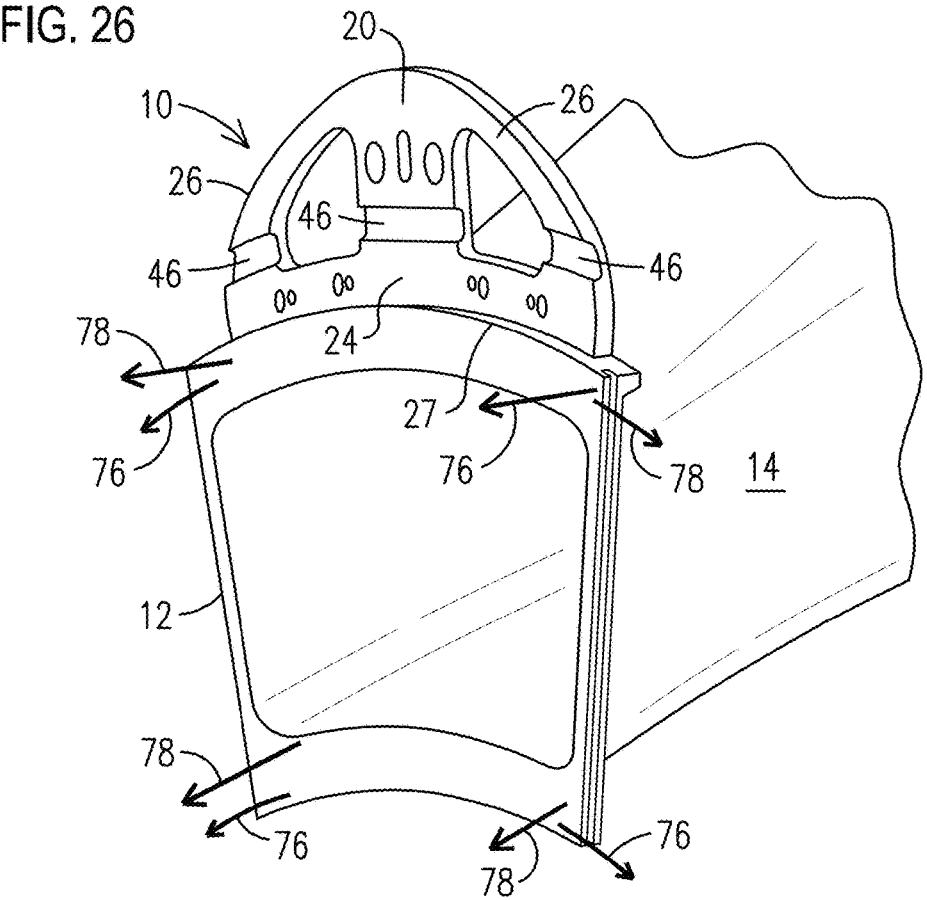
FIG. 26 schematically illustrates one non-limiting example of reduction of displacements that can be achieved in an exit frame comprising a support apparatus embodying aspects of the present invention.

FIG. 26 illustrates one non-limiting example of reduction of displacements that can be achieved in an exit frame comprising a support apparatus embodying aspects of the present invention. The foregoing reduction in peak stress levels on the exit frame and transition panel is consistent with further modelling data that in one non-limiting example indicates that respective deflections of the exit frame (schematically represented by arrows 76 and 78) along the longitudinal and circumferential axes of the frame may experience approximately a threefold reduction compared to deflections experienced by an exit frame supported with a prior art support apparatus.

While embodiments of the present disclosure have been disclosed in exemplary forms, it will be apparent to those skilled in the art that many modifications, additions, and deletions can be made therein without departing from the spirit and scope of the invention and its equivalents, as set forth in the following claims.

What is claimed is:

1. A transition duct support apparatus comprising:
    a centrally-disposed section circumferentially extending along an exit frame in a transition duct from a combustor to a turbine;
    a single continuous stiffener connected to the centrally-disposed section and disposed radially inwardly relative to the centrally-disposed section in a direction toward the exit frame, the single continuous stiffener circumferentially extending between mutually opposed corners of the exit frame of the transition duct, the single continuous stiffener arranged to provide support to an outer edge of the exit frame in the transition duct; and
    a brace connected to the centrally-disposed section and disposed radially outwardly relative to the single continuous stiffener in a direction outward the exit frame, the support apparatus effective to provide a respective tuned level of stiffness support with respect to one or more axes of the exit frame in the transition duct,
    wherein the brace is configured to circumferentially extend at an incline with respect to the single continuous stiffener towards the mutually opposed corners of the exit frame of the transition duct to support respective end portions of the single continuous stiffener, and
    wherein the centrally-disposed section connects the brace to the single continuous stiffener to form an integral structure being a plate, the plate having a flat surface extending along a radial plane along a radial direction of the exit frame, wherein the centrally-disposed section, the brace, and the single continuous stiffener are disposed entirely on the radial plane.

2. The transition duct support apparatus of claim 1, comprising at least one access opening.

3. The transition duct support apparatus of claim 1, further comprising at least one notch and/or at least one hinge effective to attain the respective tuned level of stiffness support with respect to the one or more axes of the exit frame in the transition duct.

4. The transition duct support apparatus of claim 3, wherein the at least one notch and/or the at least one hinge are arranged to provide bending flexibility about a circumferential axis.

5. The transition duct support apparatus of claim 1, wherein the integral structure comprises a composite structure.

6. The transition duct support apparatus of claim 1, wherein the centrally-disposed section and the single continuous stiffener comprise an integral structure affixable to the brace.

7. The transition duct support apparatus of claim 6, further comprising at least one hinge arranged between the integral structure and the brace.

8. The transition duct support apparatus of claim 1, wherein the integral structure comprises a varying three-dimensional profile configured to attain the respective tuned level of stiffness support with respect to the one or more axes of the exit frame in the transition duct.

9. A combustor system comprising the transition duct support apparatus of claim 1.

* * * * *